US012779475B2

(12) United States Patent
Lee et al.

(10) Patent No.: US 12,779,475 B2
(45) Date of Patent: Nov. 3, 2026

(54) CELL SEPARATION CONTROL DEVICE

(71) Applicant: CTCELLS, INC., Daegu (KR)

(72) Inventors: Jung Min Lee, Daegu (KR); Jong Man Kim, Daegu (KR)

(73) Assignee: CTCELLS, INC., Daegu (KR)

( * ) Notice: Subject to any disclaimer, the term of this patent is extended or adjusted under 35 U.S.C. 154(b) by 580 days.

(21) Appl. No.: 18/285,035

(22) PCT Filed: Mar. 28, 2022

(86) PCT No.: PCT/KR2022/004357
§ 371 (c)(1),
(2) Date: Feb. 22, 2024

(87) PCT Pub. No.: WO2022/211429
PCT Pub. Date: Oct. 6, 2022

(65) Prior Publication Data

US 2024/0416362 A1 Dec. 19, 2024

(30) Foreign Application Priority Data

Mar. 31, 2021 (KR) ........................ 10-2021-0042400

(51) Int. Cl.
*B04B 5/04* (2006.01)
*B04B 11/04* (2006.01)

(52) U.S. Cl.
CPC ............ *B04B 5/0442* (2013.01); *B04B 11/04* (2013.01)

(58) Field of Classification Search
CPC ........... B01L 3/50273; B01L 3/502738; B01L 3/502753; B01L 2200/028;
(Continued)

(56) References Cited

U.S. PATENT DOCUMENTS 6,102,897 A 8/2000 Lang
6,302,134 B1 10/2001 Kellogg et al.
(Continued)

FOREIGN PATENT DOCUMENTS

CN 209175802 U 7/2019
CN 110077025 A 8/2019
(Continued)

OTHER PUBLICATIONS

European Patent Office, "Extended European Search Report", issued for European counterpart Application No. 22781548.7 dated May 11, 2026.

*Primary Examiner* — Michael L Hobbs

(74) *Attorney, Agent, or Firm* — Bridgeway IP Law Group, PLLC; Sang Ho Lee; Hyun Woo Shin

(57) ABSTRACT

A cell separation control apparatus may include a separation disc having a plurality of chambers and configured to separate a target material from a sample by means of a centrifugal force generated by a rotation, a printed circuit board coupled to the separation disc and having heating terminals configured to transfer heat to valves in channels that connect the plurality of chambers of the separation disc, and a plurality of pressing parts provided on the printed circuit board and configured to transfer heat from the heating terminals to the valves by pressing the heating terminals toward the valves.

12 Claims, 7 Drawing Sheets

(58) Field of Classification Search
CPC ... B01L 2200/00631; B01L 2300/0806; B01L 2300/1805; B01L 2400/0409; B01L 2400/06; B01L 2400/0677; B04B 5/0442; B04B 11/04
See application file for complete search history.

(56) References Cited

U.S. PATENT DOCUMENTS

| | | | |
|---|---|---|---|
| 8,490,655 | B2 | 7/2013 | Park et al. |
| 2005/0095172 | A1 | 5/2005 | Nagaoka et al. |
| 2018/0093270 | A1 | 4/2018 | Ladtkow et al. |
| 2020/0025312 | A1* | 1/2020 | Kim .................. B01L 3/502738 |

FOREIGN PATENT DOCUMENTS

| | | | | |
|---|---|---|---|---|
| CN | 212149516 | U | 12/2020 | |
| JP | 2001-170982 | A | 6/2001 | |
| JP | 2003-270252 | A | 9/2003 | |
| JP | 2006-010340 | A | 1/2006 | |
| JP | 2019-530574 | A | 10/2019 | |
| JP | 2019530574 | * | 10/2019 | ............... B04B 5/02 |
| KR | 10-1998-0077250 | A | 11/1998 | |
| KR | 10-2011-0048673 | A | 5/2011 | |
| KR | 10-1239764 | B1 | 3/2013 | |
| KR | 10-2013-0080307 | A | 7/2013 | |
| KR | 10-2013-0086743 | A | 8/2013 | |
| KR | 10-1974587 | B1 | 5/2019 | |
| KR | 10-2020-0112759 | A | 10/2020 | |
| KR | 10-2020-0143578 | A | 12/2020 | |

* cited by examiner

CELL SEPARATION CONTROL DEVICE

TECHNICAL FIELD

The present disclosure relates to a cell separation control apparatus, and more particularly, to a cell separation control apparatus capable of accurately and smoothly performing an operation of opening or closing a valve by properly transferring to the valve provided in a channel that connects chambers of a separation disc.

BACKGROUND ART

Most deaths from malignant tumors are caused by metastasis to tissues and organs located away from the site where the tumor initially originated. Therefore, early detection of metastasis is an important determinant of a cancer patient's chances of survival.

The process of detecting tumors early and monitoring the growth of tumors is considered very important for the successful treatment of cancer patients.

In general, cancer is diagnosed by a diagnostic technique called histopathology. The histopathology is a diagnostic technique that diagnoses tumors using tissue samples obtained from biopsies. This histopathologic approach enables direct observation of the tumor cells.

Meanwhile, circulating tumor cells (CTCs) are known to be found in patients before the tumor is detected for the first time. Therefore, circulating tumor cells may serve as an important factor in the early diagnosis and prediction of cancer. Since cancer usually spreads through the blood, circulating tumor cells can be a diagnostic marker for cancer metastasis.

To this end, a disk-type device that extracts target cells such as circulating tumor cells from samples such as blood is being researched and developed.

For example, a disc device in the related art includes a disc having a plurality of chambers. The disc device generates a centrifugal force by rotating the disc and separates target cells, such as circulating tumor cells, from the blood by using the centrifugal force.

The plurality of chambers may schematically include a main chamber and a separation chamber connected to the main chamber through a channel. A valve is provided in the channel, and a material may be moved by an operation of opening or closing the valve.

In the disc device in the related art, the valve is generally made of wax or the like that reacts with heat. However, heat is not properly transferred to the valve, which causes a risk of an error in the operation of the valve.

Therefore, there is a need to develop a cell separation control apparatus having a new configuration capable of accurately and smoothly performing an operation of separating target cells by accurately operating the valve.

As a related art, there is Korean Patent Laid-Open No. 10-2020-0143578 (entitled METHOD FOR MASS PROLIFERATION OF NK CELLS ISOLATED FROM WHOLE BLOOD).

Disclosure

Technical Problem

An object of the present disclosure is to provide a cell separation control apparatus capable of accurately and smoothly performing an operation of opening or closing a valve by properly transferring heat to the valve provided in a channel that connects chambers of a separation disc.

Technical problems to be solved by the present disclosure are not limited to the above-mentioned technical problem(s), and other technical problem(s), which are not mentioned above, may be clearly understood by those skilled in the art from the following descriptions.

Technical Solution

A cell separation control apparatus according to an embodiment of the present disclosure may include a separation disc having a plurality of chambers and configured to separate a target material from a sample by means of a centrifugal force generated by a rotation, a printed circuit board coupled to the separation disc and having heating terminals configured to transfer heat to valves in channels that connect the plurality of chambers of the separation disc, and a plurality of pressing parts provided on the printed circuit board and configured to transfer heat from the heating terminals to the valves by pressing the heating terminals toward the valves.

According to the embodiment, the plurality of pressing parts may be coupled to a pressing plate, and the pressing parts may press the heating terminals when the pressing plate is fixed to the printed circuit board.

According to the embodiment, the plurality of pressing parts each may include: a fixed rod fixed to the pressing plate so as to correspond to the heating terminal; a pressing rod coupled to the fixed rod and configured to be movable in a length direction of the fixed rod and press the heating terminal; and a spring mounted in the fixed rod and configured to generate a force for pressing the pressing rod toward the heating terminal.

According to the embodiment, the separation disc, the printed circuit board, the pressing plate, and a rotor configured to generate a rotational force may be coupled by a locking part that penetrates centers of the separation disc, the printed circuit board, the pressing plate, and the rotor.

According to the embodiment, a locking groove for locking an end of the locking part may be provided at a center of the rotor, and the end of the locking part may be locked when the end of the locking part is inserted into the locking groove and then rotated.

According to the embodiment, the pressing parts may be pressed against the heating terminals when the separation disc, the printed circuit board, the pressing plate, and the rotor are locked by the locking part.

According to the embodiment, the printed circuit board may be coupled to the separation disc by a plurality of locking bolts.

According to the embodiment, a fixing pin may be provided at an end of the locking bolt and have a straight shape (–) extending in two directions perpendicular to a length direction of the locking bolt, a pinhole, which corresponds to a shape of the fixing pin, may be formed through the printed circuit board, a through-hole, which is penetrated by the fixing pin, may be formed in a cover of the separation disc, and a fixing groove, to which the fixing pin is fixed, may be formed in an inner surface of the cover.

According to the embodiment, a material constituting the valve in the channel may be thermoplastic resin or a phase transition material that is in a solid state at room temperature and experiences phase transition by heat.

According to the embodiment, the phase transition material constituting the valve in the channel may be wax, and the wax may be paraffin wax, microcrystalline wax, petrolatum wax, animal or vegetable synthetic wax, or natural wax.

According to the embodiment, a recess hole may be formed through the separation disc in a depth direction from an upper surface of the separation disc, a cover hole may be formed in a cover of the separation disc so as to correspond to the recess hole, a board hole may be formed in the printed circuit board so as to correspond to the cover hole, an alignment hole may be formed in the pressing plate so as to correspond to the board hole, and an alignment pin for alignment may be coupled to the alignment hole, the board hole, the cover hole, and the recess hole.

According to the embodiment, a lower end of the alignment pin may have a conical shape having a diameter decreasing downward, a central portion of the alignment pin may have a cylindrical shape, and an upper end of the alignment pin may have a larger diameter than the alignment hole and be supported by the alignment hole.

Advantageous Effects

According to the embodiment of the present disclosure, the operation of opening or closing the valve may be accurately and smoothly performed by properly transferring heat to the valve provided in the channel that connects the chambers of the separation disc. Therefore, the operation of separating the target cells may be reliably performed in the separation disc.

In addition, the printed circuit board may be quickly and simply coupled to the separation disc by the locking bolts. Further, the rotor, the separation disc, the printed circuit board, and the pressing plate may be easily fastened by the locking part.

DESCRIPTION OF MAIN REFERENCE NUMERALS OF DRAWINGS

Figure 1:
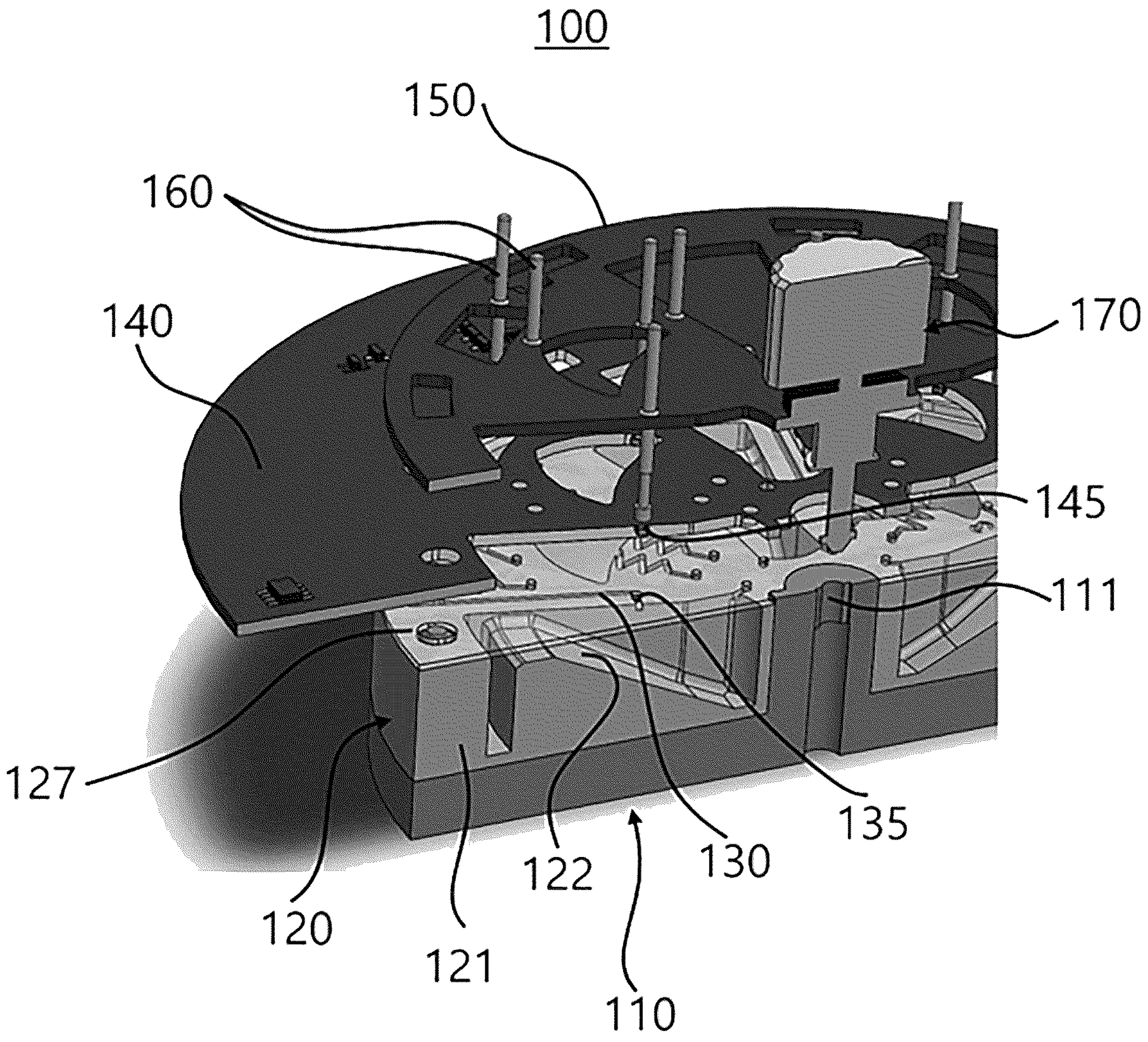
FIG. 1 is a partially cut-out perspective view illustrating a cell separation control apparatus according to an embodiment of the present disclosure.

100: Cell separation control apparatus
110: Rotor
111: Locking groove
120: Separation disc
121: Disc body
122: Main chamber
127: Cover
128: Through-hole
129: Fixing groove
130: Channel
135: Valve
140: Printed circuit board
145: Heating terminal
146: Pinhole
150: Pressing plate
160: Pressing part
161: Fixed rod
163: Pressing rod
165: Spring
170: Locking part
180: Locking bolt
181: Fixing pin
190: Alignment pin

Mode for Carrying Out the Invention

Advantages and/or features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art to which the present disclosure pertains can fully understand the scope of the present disclosure. The present disclosure will be defined only by the scope of the appended claims. Like reference numerals indicate like constituent elements throughout the specification.

Hereinafter, exemplary embodiments of the present disclosure will be described in detail with reference to the accompanying drawings.

Figure 2:
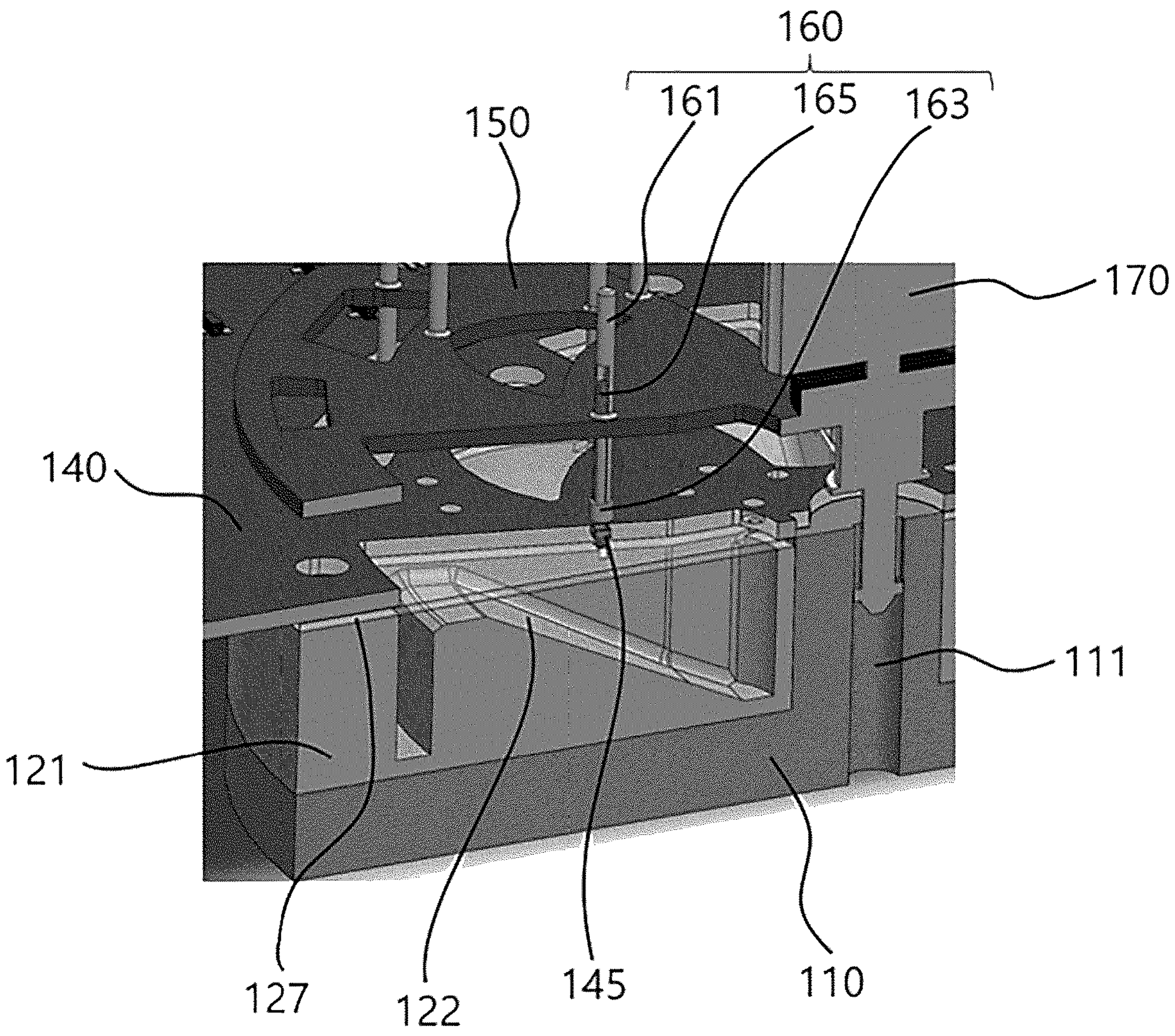
FIG. 2 is a cut-out perspective view illustrating a state in which components of the cell separation control apparatus illustrated in FIG. 1 are coupled by a locking part.
Figure 3:
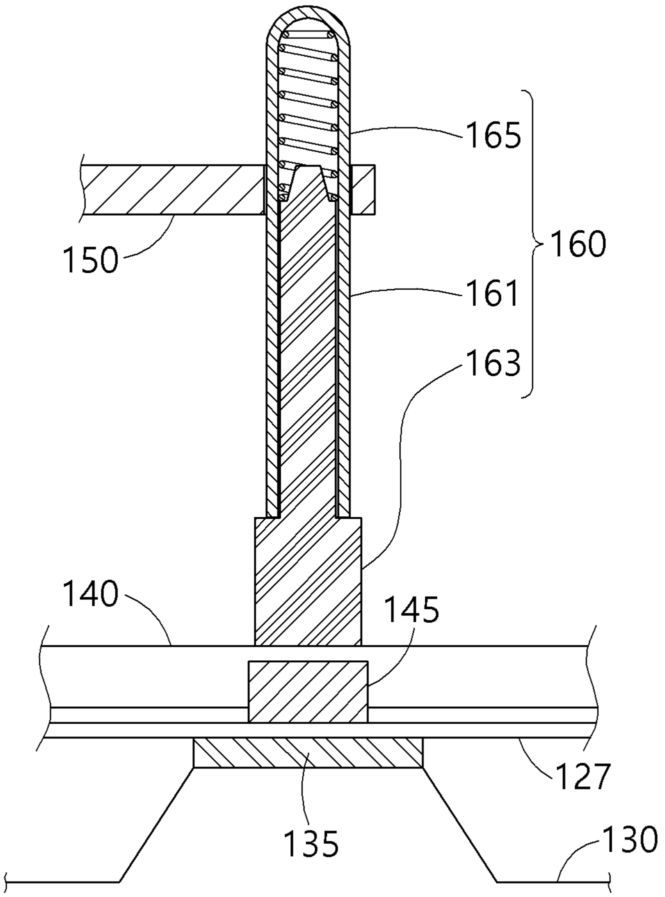
FIG. 3 is a view schematically illustrating a process of pressing a heating terminal by using a pressing part illustrated in FIG. 1.
Figure 4:
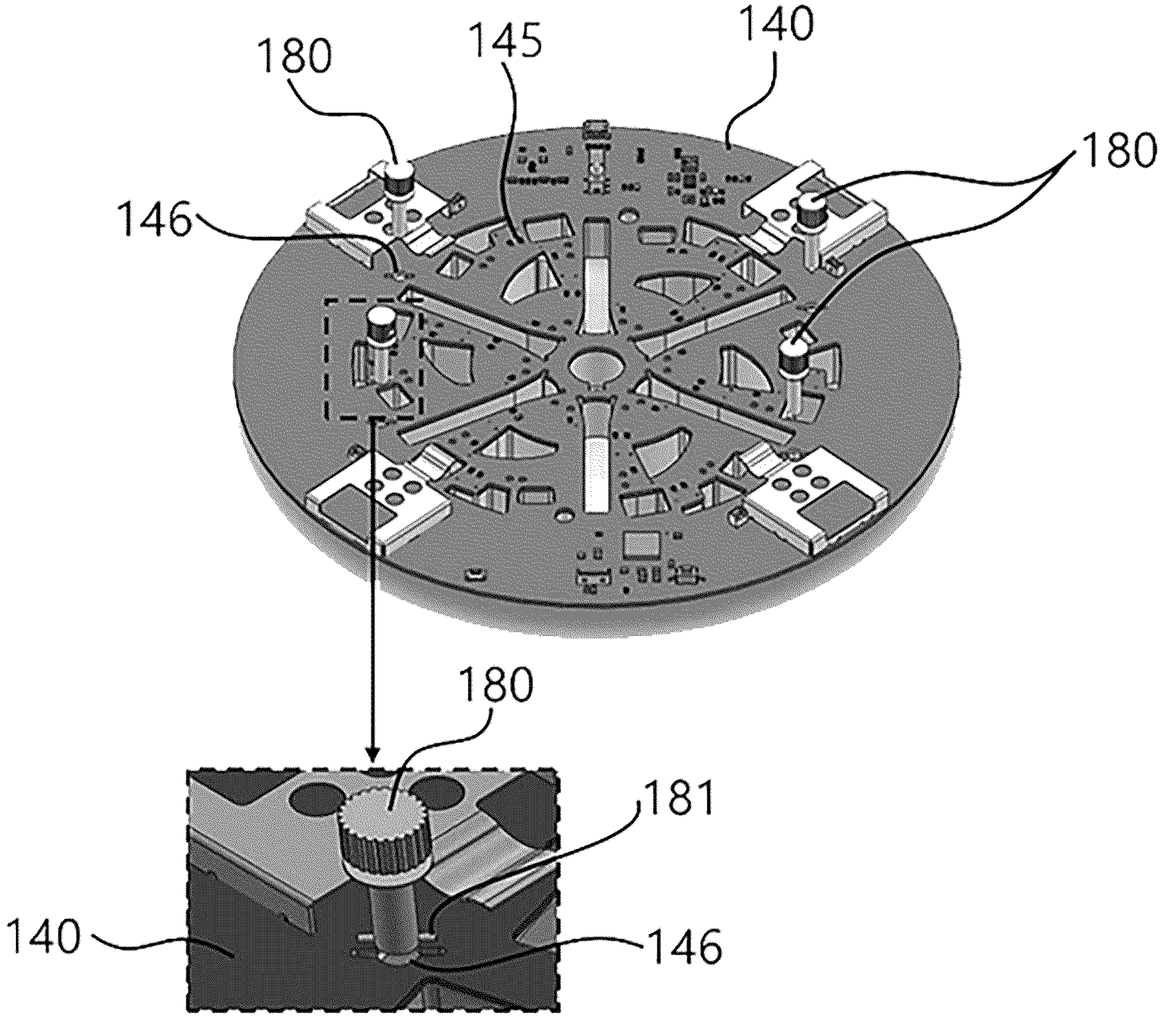
FIG. 4 is a view illustrating a state in which a separation disc and a printed circuit board illustrated in FIG. 1 are coupled by a locking bolt.
Figure 5:
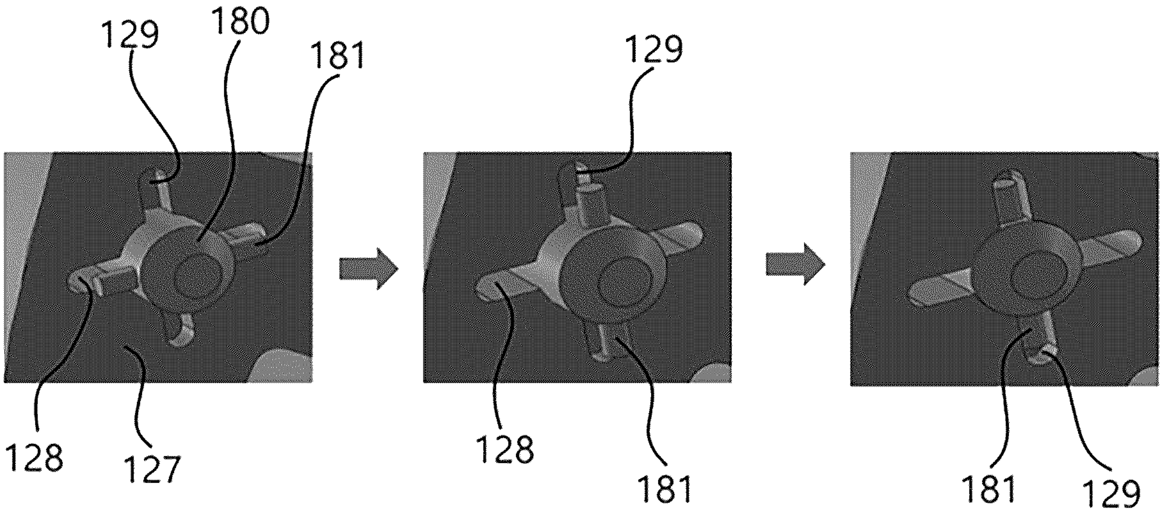
FIG. 5 is a view sequentially illustrating a locking process using the locking bolt illustrated in FIG. 5.
Figure 6:
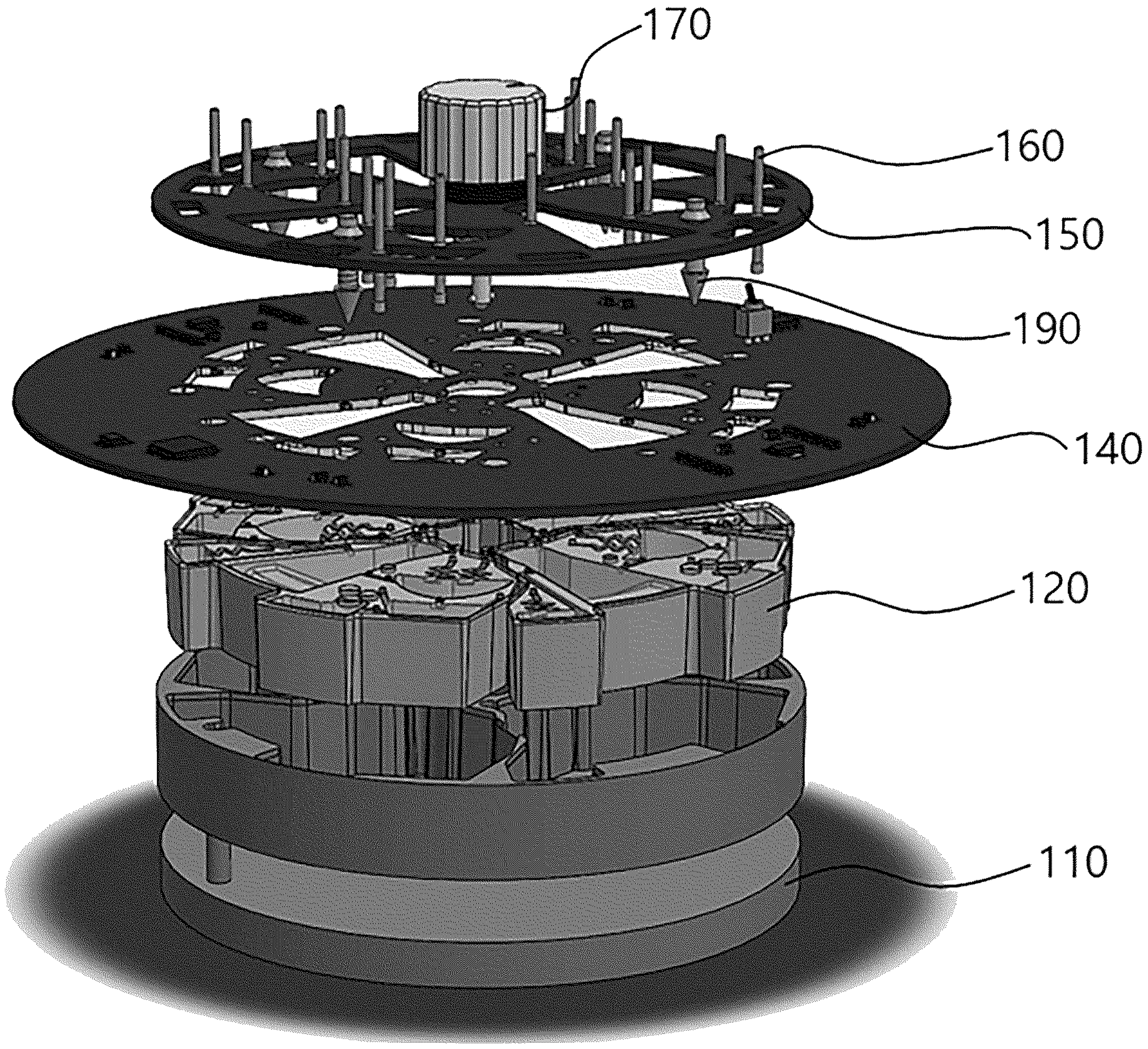
FIG. 6 is an exploded perspective view of the cell separation control apparatus according to the embodiment of the present disclosure.
Figure 7:
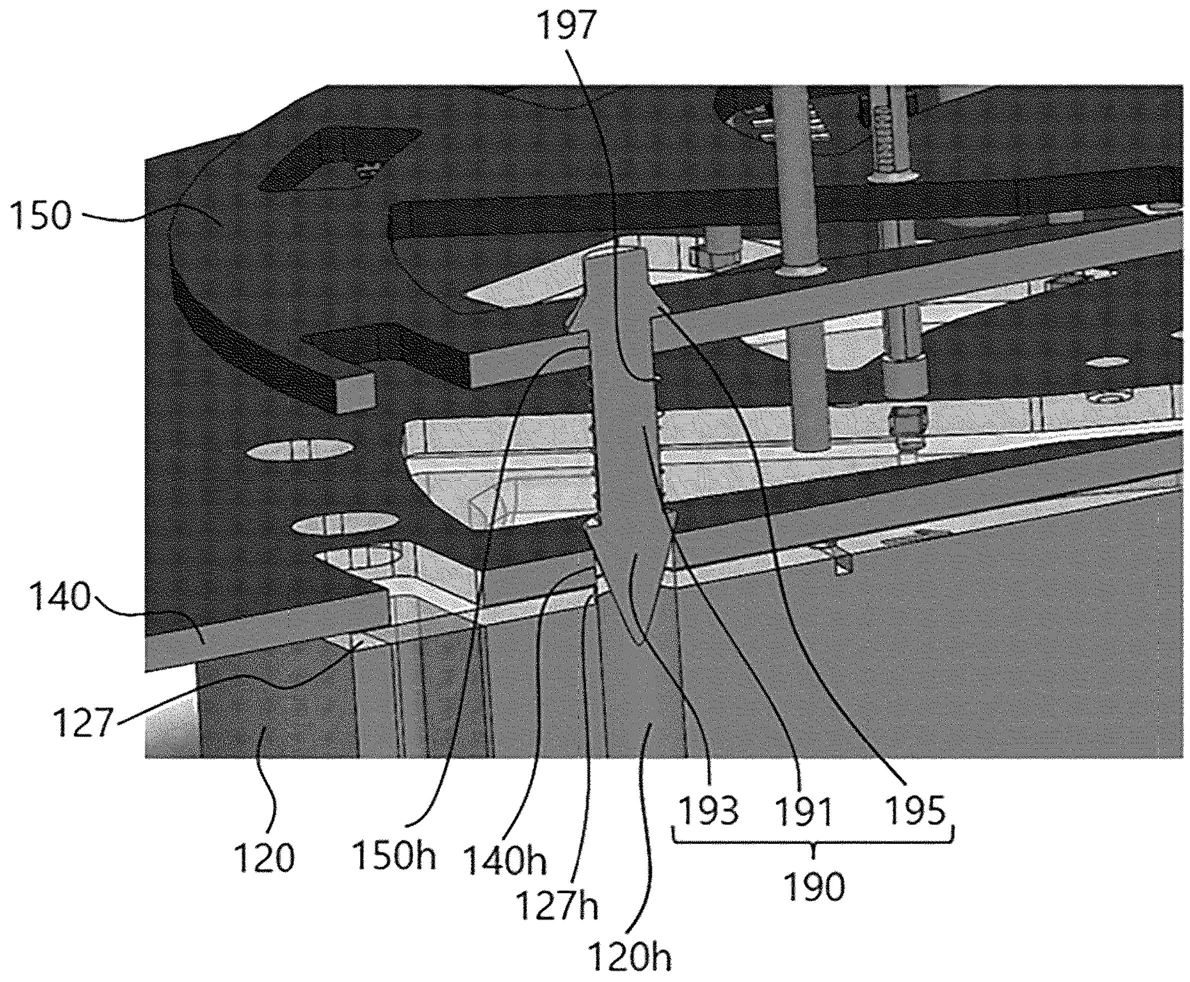
FIG. 7 is a view for explaining a configuration of an alignment pin illustrated in FIG. 6.

FIG. 1 is a partially cut-out perspective view illustrating a cell separation control apparatus according to an embodiment of the present disclosure, FIG. 2 is a cut-out perspective view illustrating a state in which components of the cell separation control apparatus illustrated in FIG. 1 are coupled by a locking part, FIG. 3 is a view schematically illustrating a process of pressing a heating terminal by using a pressing part illustrated in FIG. 1, FIG. 4 is a view illustrating a state in which a separation disc and a printed circuit board illustrated in FIG. 1 are coupled by a locking bolt, FIG. 5 is a view sequentially illustrating a locking process using the locking bolt illustrated in FIG. 5, FIG. 6 is an exploded perspective view of the cell separation control apparatus according to the embodiment of the present disclosure, and FIG. 7 is a view for explaining a configuration of an alignment pin illustrated in FIG. 6.

As illustrated in the drawings, a cell separation control apparatus 100 according to an embodiment of the present disclosure may include a rotor 110 configured to generate driving power for a rotation, a separation disc 120 coupled to the rotor 110 and configured to rotate together with a rotation of the rotor 110 and separate target cells from blood by using a generated centrifugal force, a printed circuit board 140 provided on an upper portion of the separation disc 120, coupled to the separation disc 120, and having heating terminals 145, pressing parts 160 provided on an upper portion of the printed circuit board 140, coupled to the printed circuit board 140, and configured to press the heating terminals 145, a pressing plate 150 coupled to the pressing parts and configured to allow the pressing parts 160 to press the heating terminals, and a locking part 170 configured to penetrate centers of the above-mentioned components initiating the above-mentioned components.

The components will be described. First, the rotor 110 of the present embodiment may be coupled to the separation disc 120, the printed circuit board 140, and the pressing plate 150 by means of the locking part 170. The coupled components may be rotated together by the rotation of the rotor 110.

A rotational speed or the like of the rotor 110 may be determined under the control of a controller of the present apparatus 100. A centrifugal force is generated at a rotational speed, such that the target cells may be separated from the blood in the separation disc 120.

More specifically, in the present embodiment, a case is described in which the target cells, such as circulating tumor cells, are separated from the blood by the operation of the separation disc 120. However, the present disclosure is not limited thereto. The control apparatus 100 of the present embodiment may be used to separate desired particles or cells contained in a biological sample. For example, the cell may be the circulating tumor cell (CTC).

The separation disc 120 of the present embodiment may include a disc body 121 having a disc shape, and a plurality of chambers provided in the form of grooves formed in an upper surface of the separation disc 120. Therefore, the centrifugal force, which is generated when the separation disc 120 is rotated by the rotation of the rotor 110, may be used to separate the target cells from the blood, for example.

As schematically illustrated in FIGS. 1 and 2, the plurality of chambers of the present embodiment may include a main chamber 122, a plasma separation chamber, a mixing chamber, a separation chamber, a target cell accommodation chamber, and the like.

For example, the chamber structure may separate the target cells from the blood. In order to smoothly perform this process, it is essential to smoothly operate valves 135 in channels 130 that connect the chambers.

That is, heat needs to be properly transferred to the valve 135 in the channel 130 to accurately open or close the valve 135. To this end, in the present embodiment, the printed circuit board 140 and the pressing plate 150 have heat transfer structures.

First, the valve 135 provided in the channel 130 of the present embodiment will be described. The valve 135 of the present embodiment may be made of thermoplastic resin or phase transition material that is kept in a solid state when a passageway of the channel 130 is blocked, and is melted when heat is applied.

In the present embodiment, wax may be applied as the phase transition material of the valve 135. Any one of paraffin wax, microcrystalline wax, petrolatum wax, animal or vegetable synthetic wax, and natural wax may be used as the wax. However, the present disclosure is not limited thereto.

Meanwhile, thermoplastic resin may be applied as a material for the valve 135. The thermoplastic resin may be COC (cyclic olefin copolymer), PMMA (polymethylmethacrylate), PC (polycarbonate), PS (polystyrene), POM (polyoxymethylene), PFA (perfluoralkoxy), PVC (polyvinylchloride), PP (polypropylene), PET (polyethylene terephthalate), PEEK (polyetheretherketone), PA (polyamide), PSU (polysulfone), PVDF (polyvinylidene fluoride), or the like.

With reference to FIGS. 1 to 3, the printed circuit board 140 of the present embodiment has the heating terminals 145 provided to correspond to positions of the valves 135 provided in the separation disc 120. Therefore, the passageway of the channel 130 may be opened or closed by means of the valve 135 made of wax as heat is applied from the heating terminal 145 to the valve 135 or the heat transfer is stopped.

More specifically, as illustrated in FIG. 1, for example, the valve 135 is provided in the channel 130 that connects the main chamber 122 and the plasma separation chamber. The heating terminal 145 is provided on the printed circuit board 140 so as to correspond to the position of the valve 135.

However, the valve 135 is not properly opened or closed when heat is not properly transferred even though the heating terminal 145 generates heat. Therefore, it is important to properly transfer heat by pressing the heating terminal 145 toward the valve 135.

Therefore, in the present embodiment, the pressing parts 160 are provided on the pressing plate 150. The pressing part 160 presses the heating terminal 145 toward the valve 135, such that the heat may be properly transferred from the heating terminal 145 to the valve 135 through a cover 127 of the separation disc (a top plate of the disc).

As illustrated in FIG. 1, the pressing plate 150 of the present embodiment is provided in the form of a circular plate, and the pressing parts 160 are fixed to the pressing plate 150 so as to correspond to the positions of the heating terminals 145.

As illustrated in FIGS. 1 and 2, particularly FIG. 3, the pressing parts 160 may each include a fixed rod 161 fixed to the pressing plate 150 so as to correspond to the heating terminal 145, a pressing rod 163 coupled to the fixed rod 161 and configured to be movable in a length direction of the fixed rod 161 and press the heating terminal 145, and a spring 165 mounted in the fixed rod 161 and configured to generate a force for pressing the pressing rod 163 toward the heating terminal 145.

With reference to FIG. 3, the spring 165 in the fixed rod 161 may push the pressing rod 163 toward the heating terminal 145, such that a lower end of the pressing rod 163 may apply a force to the heating terminal 145. The heating terminal 145 may properly transfer heat to the valve 135, such that the channel 130 may be properly opened or closed by the operation of the valve 135.

In other words, the efficiency in opening or closing the valve 135 may be improved as the pressing part 160 improves the efficiency in transferring heat from the heating terminal 145 to the valve 135. Therefore, as described above, the process of separating the target cells from the blood in the separation disc 120 may be reliably performed.

Meanwhile, with reference to FIGS. 1 and 2, as described above, the pressing plate 150, the printed circuit board 140, the separation disc 120, and the rotor 110 may be integrally coupled by the locking part 170 of the present embodiment.

That is, the pressing plate 150, the printed circuit board 140, and the separation disc 120 respectively have holes penetrated by the locking part 170, a locking groove 111 is formed at a center of the rotor 110, and the locking part 170 is inserted into the locking groove 111. The locking part 170 is coupled to the holes and the locking groove 111, and then the locking part 170 is rotated in one direction, such that the pressing plate 150, the printed circuit board 140, the separation disc 120, and the rotor 110 may be locked by the locking part 170.

Further, when the components are locked by the locking part 170, the pressing part 160 comes into close contact with the heating terminal 145, as illustrated in FIG. 2, such that the heat may be properly transferred from the heating terminal 145 to the valve 135.

Meanwhile, with reference to FIGS. 4 and 5, the separation disc 120 and the printed circuit board 140 may be simply coupled by a plurality of locking bolts 180. As illustrated in FIG. 4, pinholes 146 for coupling the locking bolts 180 may be formed in four regions of the printed circuit board 140, and through-holes 128, which correspond to positions of the pinholes 146, may also be formed in the cover 127 of the separation disc 120 corresponding to the printed circuit board 140.

As illustrated in FIG. 4, a fixing pin 181 may be provided at an end of the locking bolt 180 and have a straight shape (−) extending in two directions perpendicular to a length direction of the locking bolt 180. The pinhole 146 formed in the printed circuit board 140 may have a shape corresponding to the fixing pin 181.

Further, as illustrated in FIG. 5, the through-hole 128 formed in the cover 127 of the separation disc 120 may have a shape corresponding to the shape of the pinhole 146. Therefore, when the fixing pin 181 of the locking bolt 180 penetrates the pinhole 146 and the through-hole 128 and then the locking bolt 180 rotates, the printed circuit board 140 may be fastened to the separation disc 120.

More specifically, a fixing groove 129 is formed in an inner surface of the cover 127, and the fixing pin 181 is fixed to the fixing groove 129. The fixing groove 129 is formed in a direction perpendicular to the through-hole 128, such that the through-hole 128 and the fixing groove 129 may define a cross shape (+) as a whole.

Therefore, as illustrated in FIG. 5, the fixing pin 181 of the locking bolt 180 penetrates the through-hole 128, the locking bolt 180 rotates by 90 degrees, and then the locking bolt 180 is pulled, such that the fixing pin 181 may be inserted into the fixing groove 129, and thus the printed circuit board 140 may be fastened to the separation disc 120.

As described above, the separation disc 120 and the printed circuit board 140 may be simply and securely coupled by the locking bolts 180.

Meanwhile, in the present embodiment, as described above, it is important to properly align the position of the pressing part 160 with the valve 135. To this end, as illustrated in FIGS. 6 and 7, holes for alignment are formed in the components, and alignment pins 190 for alignment are coupled to the holes, such that a valve control structure using heat may be implemented.

With reference to FIG. 7, a recess hole 120*h* may be formed through the separation disc 120 in a depth direction from an upper surface of the separation disc 120, and a cover hole 127*h* may be formed in the cover 127 of the separation disc 120 so as to correspond to the recess hole 120*h*. In addition, a board hole 140*h* may be formed in the printed circuit board 140 so as to correspond to the cover hole 127*h*, and an alignment hole 150*h* may be formed in the pressing plate 150 so as to correspond to the board hole 140*h*.

Further, the alignment pin 190 for alignment is coupled to the alignment hole 150*h*, the board hole 140*h*, the cover hole 127*h*, and the recess hole 120*h*, such that the positions of the components may be accurately aligned. Therefore, the position of the pressing part 160 may also be accurately aligned with the valve 135.

As illustrated in FIG. 7, a lower end 193 of the alignment pin 190 of the present embodiment may have a conical shape having a diameter that decreases downward. Therefore, the lower end 193 may be easily inserted into the recess hole 120*h*, the cover hole 127*h*, and the board hole 140*h*.

A central portion 191 of the alignment pin 190 has a cylindrical shape, and a spring 197 is mounted on an outer surface of the central portion 191, such that the position of the pressing plate 150 with respect to the printed circuit board 140 may be securely maintained.

Further, an upper end 195 of the alignment pin 190 has a larger diameter than the alignment hole 150*h*, such that the alignment pin 190 may fix the position of the pressing plate 150. The upper end 195 of the alignment pin 190 may have a structure detachable from the central portion 191. Therefore, as illustrated in FIG. 4, the alignment process may be performed after coupling the alignment pin 190 to the pressing plate 150.

According to the embodiment of the present disclosure described above, the operation of opening or closing the valve 135 may be accurately and smoothly performed by properly transferring heat to the valve 135 provided in the channel 130 that connects the chambers of the separation disc 120. Therefore, the operation of separating the target cells may be reliably performed in the separation disc 120.

In addition, the printed circuit board 140 may be quickly and simply coupled to the separation disc 120 by the locking bolts 180. Further, the rotor 110, the separation disc 120, the printed circuit board 140, and the pressing plate 150 may be easily fastened by the locking part 170.

While the specific embodiments according to the present disclosure have been described above, various modifications may be made without departing from the scope of the present disclosure. Therefore, the scope of the present disclosure should not be limited to the described embodiments, and should be defined by not only the claims to be described below, but also those equivalent to the claims.

While the present disclosure has been described above with reference to the limited embodiments and the drawings, the present disclosure is not limited to the embodiments and may be variously modified and altered from the disclosure by those skilled in the art to which the present disclosure pertains. Therefore, the spirit of the present disclosure should be defined only by the appended claims, and all modifications, equivalents, and alternatives fall within the scope and spirit of the present disclosure.

The invention claimed is:

1. A cell separation control apparatus comprising:
- a separation disc having a plurality of chambers and configured to separate a target material from a sample by means of a centrifugal force generated by a rotation;
- a printed circuit board coupled to the separation disc and having heating terminals configured to transfer heat to valves in channels that connect the plurality of chambers of the separation disc; and
- a plurality of pressing parts provided on the printed circuit board and configured to transfer heat from the heating terminals to the valves by pressing the heating terminals toward the valves.

2. The cell separation control apparatus of claim 1, wherein the plurality of pressing parts is coupled to a pressing plate, and the pressing parts press the heating terminals when the pressing plate is fixed to the printed circuit board.

3. The cell separation control apparatus of claim 2, wherein the plurality of pressing parts each comprises:
- a fixed rod fixed to the pressing plate so as to correspond to the heating terminal;
- a pressing rod coupled to the fixed rod and configured to be movable in a length direction of the fixed rod and press the heating terminal; and
- a spring mounted in the fixed rod and configured to generate a force for pressing the pressing rod toward the heating terminal.

4. The cell separation control apparatus of claim 3, wherein the separation disc, the printed circuit board, the pressing plate, and a rotor configured to generate a rotational force are coupled by a locking part that penetrates centers of the separation disc, the printed circuit board, the pressing plate, and the rotor.

5. The cell separation control apparatus of claim 4, wherein a locking groove for locking an end of the locking part is provided at a center of the rotor, and the end of the locking part is locked when the end of the locking part is inserted into the locking groove and then rotated.

6. The cell separation control apparatus of claim 4, wherein the pressing parts are pressed against the heating terminals when the separation disc, the printed circuit board, the pressing plate, and the rotor are locked by the locking part.

7. The cell separation control apparatus of claim 1, wherein the printed circuit board is coupled to the separation disc by a plurality of locking bolts.

8. The cell separation control apparatus of claim 7, wherein a fixing pin is provided at an end of the locking bolt and has a straight shape (–) extending in two directions perpendicular to a length direction of the locking bolt, a pinhole, which corresponds to a shape of the fixing pin, is formed through the printed circuit board, a through-hole, which is penetrated by the fixing pin, is formed in a cover of the separation disc, and a fixing groove, to which the fixing pin is fixed, is formed in an inner surface of the cover.

9. The cell separation control apparatus of claim 1, wherein a material constituting the valve in the channel is thermoplastic resin or a phase transition material that is in a solid state at room temperature and experiences phase transition by heat.

10. The cell separation control apparatus of claim 9, wherein the phase transition material constituting the valve in the channel is wax, and the wax is paraffin wax, microcrystalline wax, petrolatum wax, animal or vegetable synthetic wax, or natural wax.

11. The cell separation control apparatus of claim 2, wherein a recess hole is formed through the separation disc in a depth direction from an upper surface of the separation disc, a cover hole is formed in a cover of the separation disc so as to correspond to the recess hole, a board hole is formed in the printed circuit board so as to correspond to the cover hole, an alignment hole is formed in the pressing plate so as to correspond to the board hole, and an alignment pin for alignment is coupled to the alignment hole, the board hole, the cover hole, and the recess hole.

12. The cell separation control apparatus of claim 11, wherein a lower end of the alignment pin has a conical shape having a diameter decreasing downward, a central portion of the alignment pin has a cylindrical shape, and an upper end of the alignment pin has a larger diameter than the alignment hole and is supported by the alignment hole.

* * * * *